United States Patent Office 2,868,740
Patented Jan. 13, 1959

2,868,740

METHOD OF COPOLYMERIZING ACRYLIC OR METHACRYLIC ACID WITH PROTEINACEOUS MATERIAL AND PRODUCT OBTAINED

Stewart B. Luce, La Grange, Ill., assignor to Swift & Company, Chicago, Ill., a corporation of Illinois No Drawing. Application March 25, 1954
Serial No. 418,767

10 Claims. (Cl. 260—8)

The present invention in general relates to a new and useful polymer. More specifically, this invention comprises a polymer of a proteinaceous material and olefines of the acrylic acid series.

In the past, stick, which is a thick syrup obtained by evaporation of stick water from tankage in the processing of animals, has been useful only to a limited extent, primarily as a supplement for animal feed stock. Oftentimes the stick has been discarded as waste because of its limited utility. The present invention relates to a new and useful composition in which stick is utilized to produce a new and useful product. While the following description is directed to compositions including stick, other proteinaceous materials, such as glue, protein hydrolyzate, gelatin, blood, soya protein, casein, chicken feathers, hoof meal, etc., may be used in the same manner.

Therefore, it is an object of this invention to produce a new and useful polymer utilizing a proteinaceous material.

An additional object is to provide a new and useful composition utilizing the proteinaceous constituents of stick water.

A further object of this invention is to provide new polymers of proteinaceous materials and olefines of the acrylic acid series, and salts of said polymers.

Another object of the invention is to teach a new method for producing a polymer of water-soluble olefine and a proteinaceous material.

Other objects will be apparent to one skilled in the art from the following detailed description.

In general the present invention relates to a high molecular weight polymer and a method for preparing said polymer. The method comprises the polymerization of a water-soluble monomer of an olefinic organic compound in the presence of a proteinaceous material in an aqueous medium. The polymer so produced is useful as a water-insoluble film for coating purposes and as an adhesive. Upon application of heat to said film, it may be rendered insoluble to organic solvents. Water solutions of alkali metal salts are useful in grease-proofing, and the water-soluble ammonium salt of the polymer, upon application of heat, produces a water- and solvent-resistant film. The water-soluble alkali metal salts of the polymer are additionally useful as soil conditioners because of their extremely high molecular weight, a property necessary for a good soil conditioner. This polymer has additional advantages because of its available nitrogen content, which may be utilized to make up or supplement the available nitrogen in a mixture of fertilizer and conditioner.

The following examples typify the polymers of the present invention and the method for producing them and are to be construed as illustrative of, and not as limiting, the scope of the invention.

*Example I*

A mixture of 100 g. 90% aqueous methacrylic acid
500 cc. water
110 g. dried stick containing about 10% moisture
4 cc. Albone (37% hydrogen peroxide)

was heated with stirring on a water bath at 90–98° C. for two hours. During this time a dark material separated from the solution and settled on the bottom of the flask. After cooling, the supernatent liquid was poured off, leaving a dark rubbery product. The product was dissolved in alkali, and the crude solids recovered were calculated to be equal to the theoretical solids used.

A portion of the dissolved polymer was acidified with HCl, and the precipitate was dried and titrated with standard alkali. The product thus titrated showed an equivalent of 31% carboxyl groups.

Without peroxide no reaction of the mixture occurred even after several hours. Stick alone was not affected by heating in the presence of peroxide except for a slight bleaching.

*Example II*

A mixture of 340 cc. aqueous solution containing 75 g. stick solid
116 g. 65.5% aqueous solution of acrylic acid (75 g. of 100% acid)
2 cc. Albone (37% hydrogen peroxide)

was heated on a water bath at 90–95° C. for about one hour with stirring during which time the mixture thickened. The mass was poured into cold water and a semifluid precipitate separated. The polymer was washed once with hot water and then once with cold water, and the excess water was squeezed from the polymer. The dried product weighed 50 g., a yield of about 33%.

*Example III*

Stick water was evaporated to 61.5% solids. The following constituents were then mixed in a flask:

487 g. stick (61.5% solids)
300 g. 90% methacrylic acid
650 g. water
6 cc. Albone (37% hydrogen peroxide)

The mixture was heated on a water bath with stirring. After raising the temperature of the bath to 90° C. in a period of 15 minutes, the heat was removed, and the mixture was cooled with continuous stirring. After 45 minutes the temperature was 70° C., and the reaction mixture was allowed to stand overnight. The rubbery polymer which settled out was stirred with fresh water at 65° C., followed by a cooling and decanting. The polymer was then rinsed with fresh cold water, the excess of which was squeezed out of the polymer.

The sodium salt of the polymer was prepared by dissolving it in an aqueous solution of 95 g. NaOH in two liters of water. The temperature was raised slightly above room temperature to hasten the rate of solution. The water-soluble salt was recovered by adding acetone to the solution until the precipitate which formed just dissolved. The mixture was then added to acetone with rapid stirring. The recovered crude dried product weighed 650 g., the calculated weight being 660 g., or a yield of about 97.5%. An analysis of this product showed 3.64% nitrogen. The nitrogen of the stick was 9.23%, or a theoretical of a copolymer of the acid and stick of 4.16%. The sodium salt had a pH of 7.7.

Alcohol may also be used to precipitate the sodium salt of the polymer. However, in commercial practice, it is preferable from an expense viewpoint to spray-dry a solution of the alkali salt at a suitable predetermined concentration. Other methods of drying, such as conventional heated rolls or moving belts, may also be used to dry the alkali polymer.

*Example IV*

The following mixture was placed in a flask:

81 g. stick (50 g. solids)
1,169 g. water (to make about 4% solids)
50 g. 90% methacrylic acid
1 cc. Albone (37% hydrogen peroxide)

The mixture was stirred at 90–97° C. for four hours. Upon cooling, the polymer which had formed was removed. Another cc. of Albone was added to the supernatent liquid, and the reaction was continued until a further quantity of polymer had formed. This polymer was removed, and the above step was repeated on the supernatent liquid, using an additional 1 cc. of Albone. No appreciable polymer resulted. The polymers formed were dried and yielded 57 g. or 60% of theoretical solids. The product contained 18.8% carboxyl groups.

*Example V*

A mixture utilizing stick water from the processing plant was reacted as follows:

325 g. stick water (2.63% solids)
10 g. 90% methacrylic acid
2 cc. Albone (37% hydrogen peroxide)

The mixture was heated with stirring at 95–100° C. for 2½ hours. The mixture was cooled, and the liquid was decanted from the polymer. The excess water was squeezed from the rubbery polymer, which was then dried. The product recovered was 79.6% of the theoretical solids and had 23.1% carboxyl groups.

The above examples illustrate that the polymer may be formed from any concentration of stick. The preferred ratio of stick to the total solids from an economic viewpoint is about 50–55%, and the commercially feasible ratio is about 40–60%. The following table illustrates the yields at various concentrations after thorough washing of the polymer with boiling water to remove any water-soluble products:

|  | A | B | C | D | E |
|---|---|---|---|---|---|
| Percent stick solids | 82.6 | 61.4 | 55.0 | 50.0 | 22.5 |
| Percent methacrylic acid (100%) | 17.4 | 38.6 | 45.0 | 50.0 | 77.5 |
| Yield, dried polymer (percent theory) | 18.6 | 61.3 | 75.0 | 74.5 | 48.8 |
| Percent carboxyl in polymer | 20.5 | 27.4 | 28.8 | 27.8 | 30.7 |

The polymers of the present invention are soluble in alcohol, aqueous alcohol, acetone, aqueous acetone, and other organic solvents which are miscible with water. These solvents may be used as carriers for the polymer when it is employed as a coating material.

The polymers prepared according to the foregoing examples have also displayed good adhesive properties. Although the polymer itself is unaffected by heating, a mixture of the polymer and a small amount of a peptizing agent, such as urea, thiourea, or dicyandiamide, gave a viscous smooth melt upon heating. The melt can be used as is, or diluted with water to get better spreadability. An adhesive composed of 110 grams of the polymer and 16.5 grams of any one of the above-mentioned peptizing agents adhered paper to glass readily, and after drying for 24 hours, withstood a soaking in water for 48 hours.

The data in Example III indicates that the polymer formed may be a copolymer of the acid and protein. However, due to the complex structure of protein materials, it is possible that a protein salt of the polymerized acid is the final product since proteins have no unsaturated groups with which to combine with the olefinic acid unsaturated groups. Because of the mild conditions of the reaction at a temperature below the boiling point of water and the use of the acid rather than the anhydride, it is improbable that the protein amide of the polymerized acid is the final product. Amide formation requires enough heat to drive out the elements of water. Also, in Example III, for instance, the carboxyl groups in the polymer amounted to 9.2% of the wet product. The total carboxyl groups of the reactants equalled 9.8%. Had the amide been formed, a complete neutralization of the carboxyl groups, or at least a substantial lowering of the number of the carboxyl groups, would be expected. In addition, a mixture of stick and methacrylic acid in water solution without the catalyst gives no apparent change when held at 80–100° C. for several hours.

Obviously, many modifications and variations of the invention as hereinbefore set forth may be made without departing from the spirit and scope thereof, and therefore only such limitations should be imposed as are indicated in the appended claims.

I claim:

1. A composition of matter produced by the polymerization of a proteinaceous material selected from the group consisting of stick, glue, protein hydrolyzate, gelatin, blood, soya protein, casein, chicken feathers, and hoof meal in the presence of water and a peroxide catalyst with a compound selected from the group consisting of acrylic acid, methacrylic acid, and mixtures of said acids.

2. A composition of matter as in claim 1 wherein the proteinaceous material is stick.

3. A composition of matter as in claim 1 wherein the proteinaceous material is glue.

4. A composition of matter as in claim 1 wherein the proteinaceous material is protein hydrolyzate.

5. The process comprising polymerizing a proteinaceous material selected from the group consisting of stick, glue, protein hydrolyzate, gelatin, blood, soya protein, casein, chicken feathers, and hoof meal in the presence of water and a peroxide catalyst with a compound selected from the group consisting of acrylic acid, methacrylic acid, and mixtures of said acids.

6. The process of claim 5 wherein the proteinaceous material is stick.

7. The process of claim 5 wherein the proteinaceous material is glue.

8. A composition of matter which comprises the alkali salt of a material produced by the polymerization of a proteinaceous material selected from the group consisting of stick, glue, protein hydrolyzate, gelatin, blood, soya protein, casein, chicken feathers, and hoof meal in the presence of water and a peroxide catalyst with a compound selected from the group consisting of acrylic acid, methacrylic acid, and mixtures of said acids.

9. A method for producing a polymer from stick which comprises: mixing stick and a compound selected from the group consisting of acrylic acid, methacrylic acid, and mixtures thereof in an aqueous medium, and heating the mixture in the presence of a peroxide catalyst to form a water insoluble polymer.

10. A method for producing a polymer from stick which comprises: mixing stick and methacrylic acid in an aqueous medium at a temperature between about 90 and 100° C. in the presence of a peroxide catalyst, and continuing said reaction until a substantial amount of water insoluble polymer is formed, the stick solids comprising 40 to 60% of the total stick and methacrylic acid solids of said mixture.

References Cited in the file of this patent

UNITED STATES PATENTS

| 2,006,002 | Schneider | June 25, 1935 |
| 2,354,210 | Jacobson | July 25, 1944 |
| 2,399,084 | Watson | Apr. 23, 1946 |
| 2,518,666 | Damschroeder et al. | Aug. 15, 1950 |
| 2,548,520 | Damschroeder et al. | Apr. 10, 1951 |
| 2,824,077 | Priest | Feb. 18, 1958 |